(12) United States Patent
Cole

(10) Patent No.: US 6,773,200 B2
(45) Date of Patent: Aug. 10, 2004

(54) HITCH-MOUNTABLE RECREATIONAL EQUIPMENT RACK

(75) Inventor: Steven J. Cole, Arcata, CA (US)

(73) Assignee: Watermark PaddleSports, Inc., Arcata, CA (US)

( * ) Notice: Subject to any disclaimer, the term of this patent is extended or adjusted under 35 U.S.C. 154(b) by 0 days.

(21) Appl. No.: 10/059,931

(22) Filed: Jan. 28, 2002

(65) Prior Publication Data

US 2002/0127055 A1 Sep. 12, 2002

Related U.S. Application Data

(60) Provisional application No. 60/265,641, filed on Jan. 31, 2001.

(51) Int. Cl.⁷ .............................. F16B 7/10; B60R 9/00
(52) U.S. Cl. .......................... 403/378; 403/21; 403/22; 403/376; 403/377
(58) Field of Search .......................... 403/21, 22, 378, 403/315, 316, 317, 377, 379.2, 376, 379.3; 411/119, 984–994; 280/506, 507; 224/518, 519, 521; 70/14, 31, 34, 258

(56) References Cited

U.S. PATENT DOCUMENTS

| | | | |
|---|---|---|---|
| 2,345,650 A | | 4/1944 | Attwood ...................... 403/21 |
| 4,741,582 A | | 5/1988 | Peroni ...................... 312/257.1 |
| 5,169,042 A | * | 12/1992 | Ching ...................... 224/42.45 |
| 5,181,822 A | * | 1/1993 | Allsop et al. ............... 414/462 |
| 5,344,175 A | | 9/1994 | Speer ......................... 280/506 |
| 5,372,287 A | * | 12/1994 | Deguevara ........... 224/42.03 B |
| 5,427,493 A | * | 6/1995 | Lucy .......................... 414/451 |
| 5,529,231 A | * | 6/1996 | Burgess ....................... 224/502 |
| 5,560,251 A | * | 10/1996 | Babinski ....................... 74/459 |
| 5,615,904 A | * | 4/1997 | Van Dusen et al. ......... 280/506 |
| 5,954,508 A | * | 9/1999 | Lo et al. ........................ 434/55 |
| 5,988,667 A | * | 11/1999 | Young ......................... 280/506 |
| 6,123,498 A | * | 9/2000 | Surkin ......................... 414/462 |
| 6,334,561 B1 | * | 1/2002 | Cole ........................... 224/251 |
| 6,409,203 B1 | * | 6/2002 | Williams ..................... 280/506 |
| 6,464,421 B1 | * | 10/2002 | Kiefer .......................... 403/21 |
| 2002/0145270 A1 | * | 10/2002 | Williams | |

\* cited by examiner

Primary Examiner—Robert Sandy
Assistant Examiner—Ruth C. Rodriguez
(74) Attorney, Agent, or Firm—Kolisch Hartwell, P.C.

(57) ABSTRACT

A recreational equipment rack system, which includes an equipment rack configured for exterior engagement on a vehicle. The equipment rack including a rack tongue configured to be inserted into and secured within a hitch receiver provided on the vehicle. A fastening mechanism configured to tightly secure the rack tongue to the hitch receiver. The fastening mechanism includes a bolt having a bolt head and a bolt post extending from the head for extending through transverse holes in the hitch receiver. The bolt post includes a threaded length and an unthreaded length. A nut assembly including a nut configured to engage the threaded length of the bolt enables selective clamping and releasing of the rack tongue with the hitch receiver. The bolt post has a removable post lock on its distal end to prevent removal of the rack from the vehicle without a security key or combination code. The threaded length of the bolt post is limited so that the threaded portion of the bolt exits the nut before the post lock contacts the exterior surface of the hitch receiver.

8 Claims, 2 Drawing Sheets

HITCH-MOUNTABLE RECREATIONAL EQUIPMENT RACK

CROSS REFERENCE TO RELATED APPLICATIONS

This application is based upon and claims priority under 35 U.S.C. § 119(e) to the following U.S. provisional patent application, which is incorporated herein by reference in its entirety for all purposes: Ser. No. 60/265,641, entitled "Hitch-Mountable Recreational Equipment Rack," filed Jan. 31, 2001.

TECHNICAL FIELD

The present invention relates generally to hitch-mountable recreational equipment racks having a locking post for securing the rack within a vehicle hitch receiver, and more particularly to devices and methods for preventing accidental or intentional withdrawal of the locking post from its locking position.

BACKGROUND OF THE INVENTION

Many recreational equipment racks can be mounted to a vehicle by securing the rack to a socket-like hitch receiver provided on the rear of the vehicle. These racks typically include a hitch attachment member, or tongue, that is inserted into the hitch receiver. The tongue and sidewalls of the hitch receiver include holes that are aligned when the tongue is fully inserted into the hitch receiver. Typically, an elongate locking post is transversely passed through these holes to hold the rack tongue in place and prevent it from pulling out of the hitch receiver.

Various devices and methods exist for preventing the locking post from moving out of its inserted position, as can happen as a result of vibration during transit. Other devices guard against not only accidental removal of the post, but also prevent theft or other intentional removal by locking the post in place. However, certain designs may fail or may be easily damaged by attempts to remove the locking post from its inserted position.

SUMMARY OF THE INVENTION

A recreational equipment rack system includes an equipment rack for mounting on a vehicle. The equipment rack includes a rack tongue configured to be inserted into and secured within a hitch receiver provided on the vehicle. A fastening mechanism is provided to tightly secure the rack tongue to the hitch receiver. The fastening mechanism includes a bolt having a bolt head and a bolt post extending from the head for extending through transverse holes in the hitch receiver. The bolt post includes a threaded length and an unthreaded length. A nut assembly including a nut configured to engage the threaded length of the bolt enables selective clamping and releasing of the rack tongue with the hitch receiver. A removable lock is provided at the distal end portion of the bolt post. The threaded length on the bolt is limited so that the threaded length disengages the nut before the lock contacts the external wall of the hitch receiver.

DETAILED DESCRIPTION OF THE INVENTION

Figure 1:
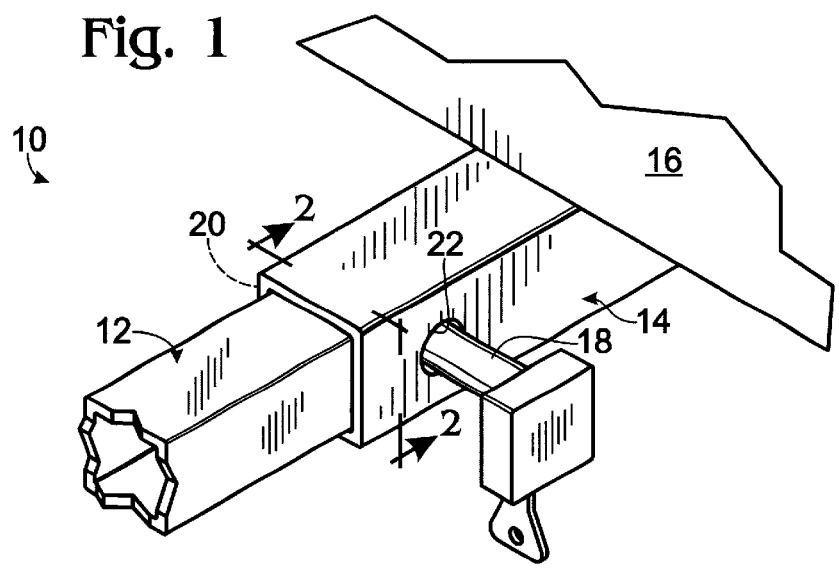
FIG. 1 is cut away of an isometric view of a vehicle bumper and a conventional hitch receiver with a rack mounted therein.
Figure 2:
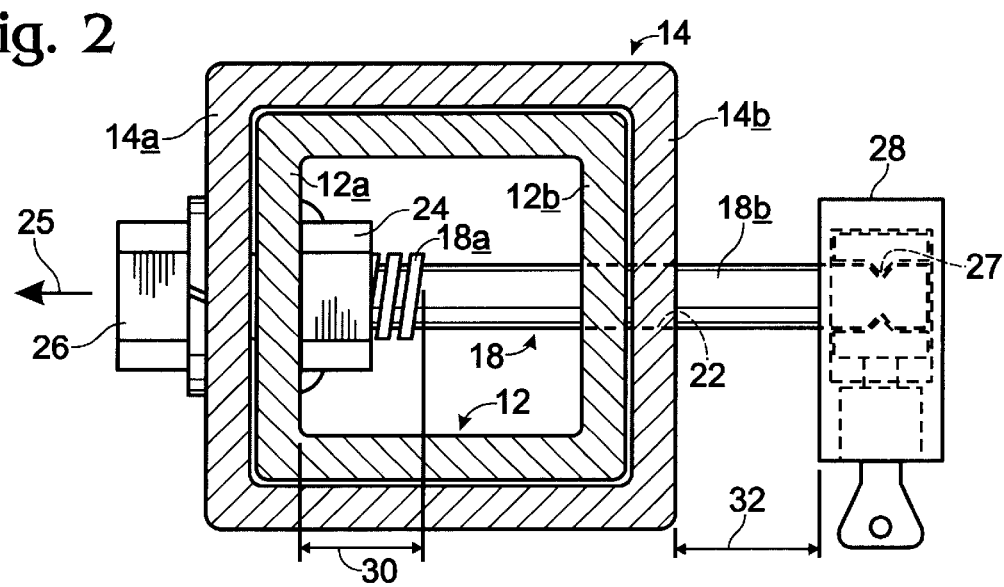
FIG. 2 is a cross-sectional view of an equipment-rack tongue secured within the hitch receiver as shown in FIG. 1 using a fastening system constructed according to one embodiment of the present invention, taken along line 2—2.

FIG. 1 depicts fastening system 10 for securing a rack tongue 12 of a recreation equipment rack (not shown) within hitch receiver 14, which is provided on the rear bumper region 16 of a vehicle. Tongue 12 is secured within hitch receiver 14 by passing bolt 18 through transverse holes 20 and 22 provided in the receiver and tongue. FIG. 2 depicts nut 24 provided within the interior of tongue 12 to receive bolt 18. The bolt and nut act as a torque-operated clamping mechanism for tightly securing the tongue to the hitch receiver.

In FIG. 2, bolt 18 and nut 24 are rotated relative to one another to selectively clamp together and release the sidewall portions 12a and 14a of the tongue and hitch receiver captured between the nut and bolt head 26. A key-operated or combination-operated post lock 28 or other retention device is provided opposite bolt head 26 to prevent withdrawal of the bolt from its inserted position. The post lock engages a nub 27 formed on the end of bolt 18 opposite head 26.

In FIG. 2, nut 24 is fixed relative to tongue 12 so that nut 24 is substantially prevented from moving relative to tongue wall 12a. Specifically, nut 24 may be welded to tongue 12 (as depicted), formed integrally as part of the tongue, or may otherwise be fixed relative to the tongue. As a result, if bolt 18 and nut 24 are threadably engaged, the bolt pulls out of its inserted position in direction 25 when loosened. This causes post lock 28 to eventually come into contact with the outer surface of the hitch receiver.

Figure 3:
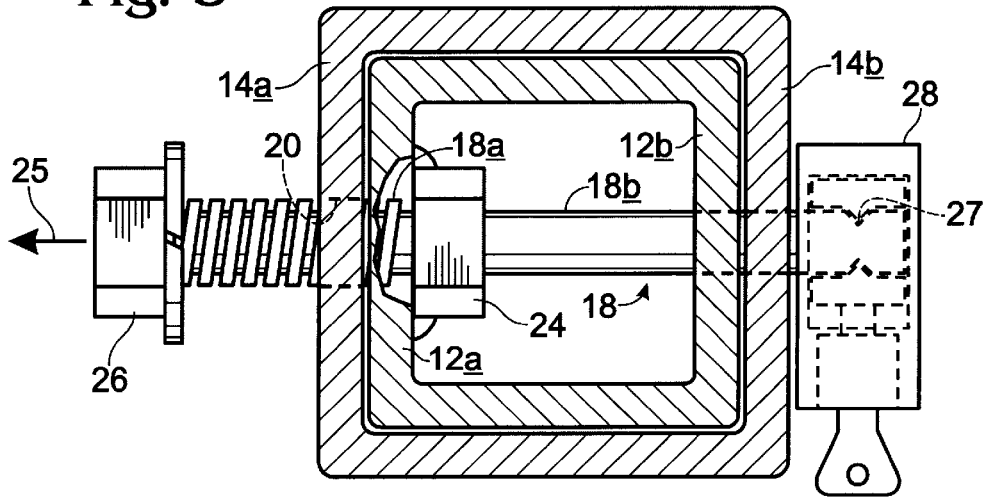
FIG. 3 is a partially cut away view of the cross-section of FIG. 2, having a locking pin unthreaded from a locking nut.

In some cases, enough force can be applied while attempting to loosen bolt 18 to break post lock 28 and drive the post lock off the end of the bolt. For example, as shown in FIG. 3, the distance that bolt head 26 must move to completely remove threaded portion 18a from nut 24 is indicated at 30. To prevent damage to post lock 28 distance 30 must be greater than distance 32, which extends from post lock 28 to an outer surface of hitch sidewall region 14b (as shown in FIG. 2). Specifically, if bolt threads 18a are still engaged with nut 24 when post lock 28 comes into contact with hitch receiver sidewall region 14b, the leveraged force caused by further unscrewing of bolt 18, may be sufficient to damage post lock 28 or cause the post lock to fail.

One way to address this problem is to reduce the length of the threaded portion of bolt 18 relative to the overall length of the bolt. This embodiment of the invention employs a thread that has a limited length so that the threaded portion of the bolt exits the nut before the post lock applies significant force against the receiver wall 14b. This may be accomplished by extending unthreaded portion 18b of the bolt so that the end of the bolt received within post lock 28 extends further away from hitch receiver 14. When the unthreaded length of bolt 18 is lengthened, bolt 18 may be fully unscrewed without bringing post lock 28 into contact with the hitch receiver sidewall 14b. Alternatively, the length of threaded portion 18a may be reduced, either alone or in combination with an overall lengthening of the bolt. As shown in FIG. 3, the threaded portion 18a disengages from nut 24 before post lock 28 contacts hitch receiver sidewall 14b.

Figure 4:
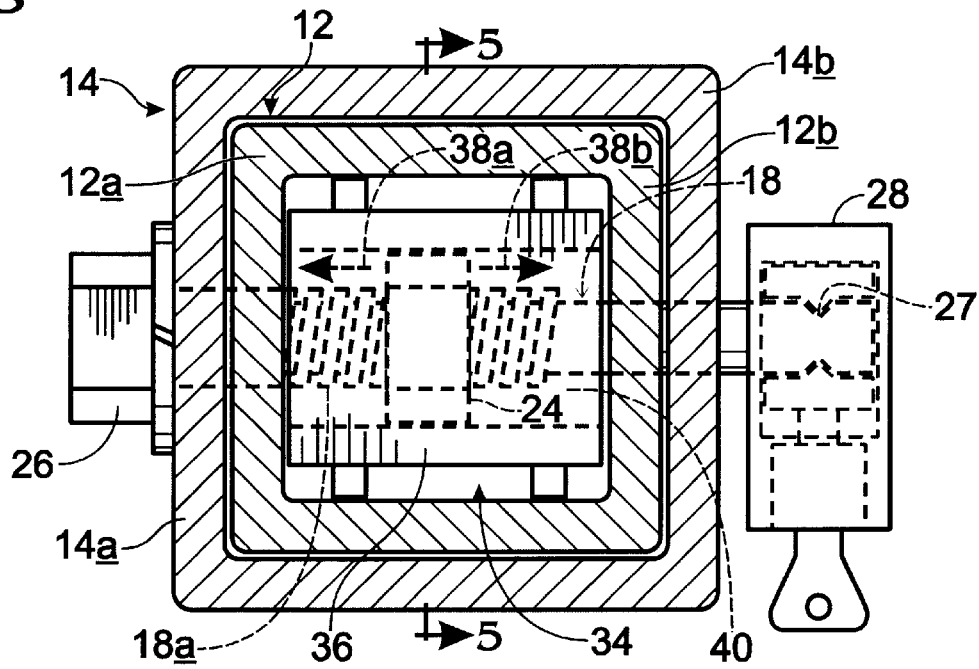
FIG. 4 is a cross-sectional view of an equipment-rack tongue secured within the hitch receiver as shown in FIG. 1 using a fastening system constructed according to another embodiment of the present invention.

FIG. 4 depicts another locking hitch mount system according to the invention. The problems discussed above are addressed in the depicted embodiment through provision of a nut assembly 34 having a floating nut 24 and receptacle 36 that reduces relative movement between bolt 18 and hitch receiver 14. Receptacle 36 is configured to hold nut 24 fixed against rotation while allowing the nut to "float" along the long axis of bolt 18 as indicated by arrows 38a and 38b. Nut receptacle 36 is provided in the interior of tongue 12, and includes a cavity 40 that is configured to grip the outer contour of nut 24 to hold it fixed against rotation. Cavity 40 is also shaped to allow the nut to move back and forth within the cavity along the long axis of bolt 18.

When bolt 18 is loosened, nut 24 moves relative to tongue 12 along arrow 38b instead of the bolt moving relative to the tongue. Nut 24 moves within cavity 40 away from bolt head 26 until the nut reaches the unthreaded portion 18b of the bolt. Friction may exist between nut 24 and the cavity walls such that loosening bolt 18 causes it to at first pull partially out of its inserted position. Bolt 18 may even pull out far enough to cause post lock 28 to contact sidewall 14b of hitch receiver 14. However, when this happens, further rotation of the bolt will create a force directed along arrow 38b sufficient to overcome the friction between the nut and the cavity walls, and the nut will begin to move relative to tongue 12. In other words, as soon as there is sufficient resistance to the bolt withdrawing from its inserted position (e.g., post lock 28 abuts receiver sidewall 14a), the nut will begin to move within the interior of nut receptacle 36 along arrow 38b. The relative motion of nut 24 relative to tongue 12 protects bolt retention lock 28 from damage and from being broken out of engagement with bolt nub 27.

Nut assembly 34 may be embodied in many different forms. For example, nut 24 may be square, hexagonal, or shaped in any other way that provides a grippable contour. Similarly, cavity 40 may be formed in any desired configuration to cooperate with the shape and size of nut 24, so that the nut is held fixed against rotation, while being permitted to move along the long axis of bolt 18.

The floating nut embodiment of the present invention requires a different threaded bolt configuration than the fixed nut embodiment. As shown in FIG. 4, floating nut 24 moves in direction 38a toward bolt head 26 when tongue 12 is being secured to hitch receiver 14. When bolt 18 is being rotated in the opposite direction to disengage tongue 12 from hitch receiver 14, then nut 24 moves in direction 38b toward tongue wall 12b. It is important for threaded portion 18a to be sufficiently long to pick up nut 24, even if nut 24 is situated against tongue wall 12b. Thus, when bolt head 26 is against receiver wall 14a, threaded portion 18a should extend slightly closer to wall 12b than the thickness of nut 24. The distance that threaded portion 18a extends into nut 24 when bolt head 26 is against receiver wall 14a and nut 24 is against tongue wall 12b, should be less than the distance between post lock 28 and the external surface of receiver wall 14b. Thus, it will not be possible to take advantage of the threaded portion of the bolt to force post lock 28 off of bolt 18. Note that the second embodiment of the invention shown in FIGS. 4 and 5 achieves a similar function to the embodiment shown in FIGS. 2 and 3, with a shorter overall bolt length.

Figure 5:
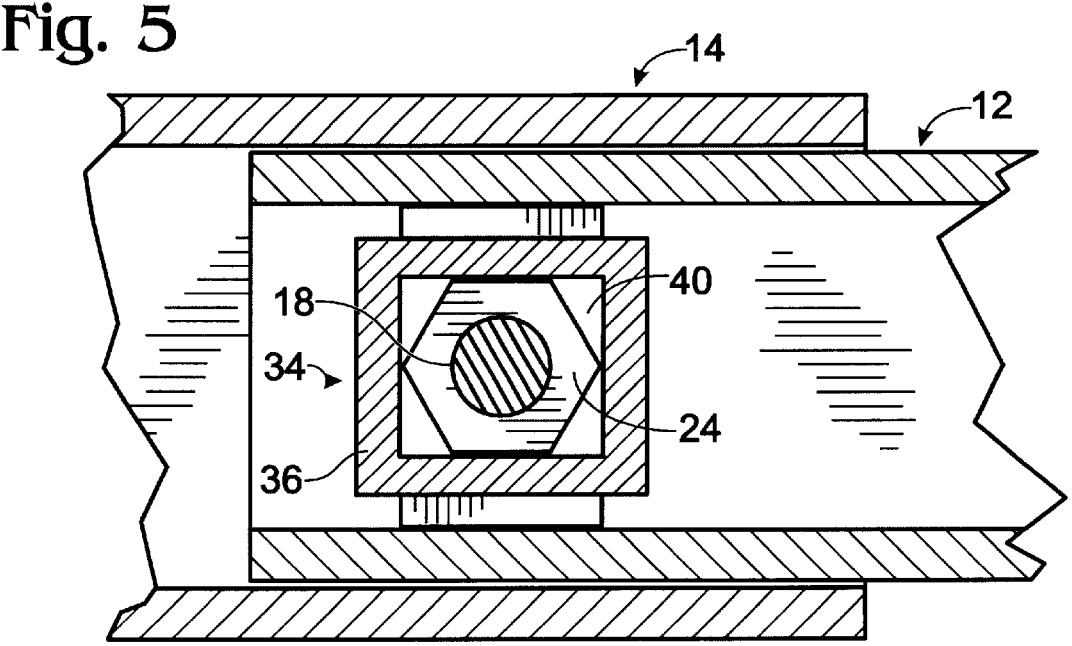
FIG. 5 is a cross-sectional view of an equipment-rack tongue secured within the hitch receiver, taken along line 5—5, showing a floating nut.

FIG. 5 depicts the floating nut embodiment of the present invention sectioned along line 5—5. Nut 24 is shown hexagonal within a square-shaped cavity 40. Two sides of nut 24 abut portions of nut receptacle 36 preventing the nut from rotating. It should be understood that a variety of shapes may be used for nut 24 and nut receptacle 36 provided the shapes cooperate to prevent the nut from rotating.

As indicated above, the invention is particularly useful in the context of recreation equipment racks and other equipment carriers. However, it should be further understood that the principles of the invention are applicable to any article secured to a vehicle hitch receiver with a transversely inserted bolt, post or similar structure.

While the present invention has been particularly shown and described with reference to the foregoing preferred embodiments, those skilled in the art will understand that many variations may be made therein without departing from the spirit and scope of the invention as variously described and defined above. The description of the invention should be understood to include all novel and nonobvious combinations of elements described herein.

I claim:

1. A recreational equipment rack system, comprising
    an equipment rack configured for exterior engagement on a vehicle including a hollow rack tongue configured to be inserted into and secured within a hitch receiver provided on the vehicle, the tongue having a pair of holes on opposing walls, that correspond to holes in the hitch receiver when the tongue and the receiver are completely engaged,
    a fastening mechanism configured to tightly secure the rack tongue to the hitch receiver, including:
        a bolt having a bolt head and a bolt post extending from the head, the bolt post including a threaded length and an unthreaded length and being configured to be inserted transversely through the holes in the tongue and the hitch receiver, and
        a nut assembly including a nut inside the tongue configured to engage the threaded length of the bolt to enable selective clamping and releasing of the rack tongue to the hitch receiver, and
    a lock device configured for removable mounting on a distal end portion of the bolt post, the threaded length of the bolt post being limited so that the threaded length exits the nut before the lock device contacts an exterior surface of the receiver.

2. The rack system of claim 1, wherein the nut has a central axis and is permitted to float longitudinally inside the tongue along the central axis, but is not allowed to rotate around the central axis.

3. The rack system of claim 2, further comprising
    a nut receptacle inside the tongue for guiding movement of the nut as the bolt post is rotated.

4. The rack system of claim 2, wherein the floating nut is supported by a nut receptacle configured to permit the floating nut to travel along the long axis of the bolt and prevent the floating nut from rotating.

5. The rack system of claim 4, wherein the floating nut is hexagonal and the nut receptacle includes a square shaped cavity sized to contact two sides of the floating nut thereby preventing it from rotating.

6. A recreational equipment rack system, comprising
    an equipment rack configured for exterior engagement on a vehicle including a hollow rack tongue configured to be inserted into and secured within a hitch receiver provided on the vehicle, the tongue having a pair of holes on opposing walls that correspond to holes in the hitch receiver when the tongue and the receiver are completely engaged, and a torque-operated clamping mechanism, including:
  a bolt having a long axis,
  a nut configured to receive a threaded portion of the bolt, where the torque-operated clamping mechanism is configured to selectively secure and release the equipment rack to the vehicle upon engagement of the bolt with the nut and rotation of the bolt relative to the nut, and
  a nut receptacle inside the hollow portion of the tongue configured to hold the nut when it is engaged with the bolt so that the nut is substantially fixed against rotation relative to the tongue and floats from side-to-side within the nut receptacle while moving along the long axis of the bolt.

7. The rack system of claim 1, wherein the nut assembly is inside the hollow portion of the tongue.

8. The rack system of claim 6, wherein the rack system further comprises a lock device configured for removable mounting on a distal end portion of the bolt post, the threaded length of the bolt post being limited so that the threaded length exits the nut before the lock device contacts an exterior surface of the receiver.

* * * * *